United States Patent
Katayama

(10) Patent No.: US 8,191,962 B2
(45) Date of Patent: Jun. 5, 2012

(54) DEFLECTOR OF SLIDING ROOF SYSTEM

(75) Inventor: Hajime Katayama, Tochigi (JP)

(73) Assignee: Yachiyo Industry Co., Ltd., Saitama (JP)

( * ) Notice: Subject to any disclaimer, the term of this patent is extended or adjusted under 35 U.S.C. 154(b) by 289 days.

(21) Appl. No.: 12/731,654

(22) Filed: Mar. 25, 2010

(65) Prior Publication Data

US 2010/0244498 A1  Sep. 30, 2010

(30) Foreign Application Priority Data

Mar. 25, 2009 (JP) ................................. 2009-074480

(51) Int. Cl.
*B60J 7/22* (2006.01)
(52) U.S. Cl. ...................................... 296/217
(58) Field of Classification Search ............ 296/217
See application file for complete search history.

(56) References Cited

U.S. PATENT DOCUMENTS
2002/0117876 A1* 8/2002 Sakai et al. .................. 296/217

FOREIGN PATENT DOCUMENTS
JP  3832948  7/2006

* cited by examiner

*Primary Examiner* — Dennis Pedder
(74) *Attorney, Agent, or Firm* — Arent Fox LLP

(57) ABSTRACT

The present invention discloses a deflector of a sliding roof system including a blade provided along on an front edge of an opening of a fixed roof and moving upward and downward along with an opening and closing movement of a roof panel; arms installed on right and left end portions of the blade, each of the arms provided with a cam pin and a support pin; a cam groove that guides the cam pin so as to define a movement trajectory of the blade; and a support groove that guides a frontward and backward movement of the support pin, wherein the support groove includes a guide frame that guides a frontward and backward movement of the roof panel.

2 Claims, 7 Drawing Sheets

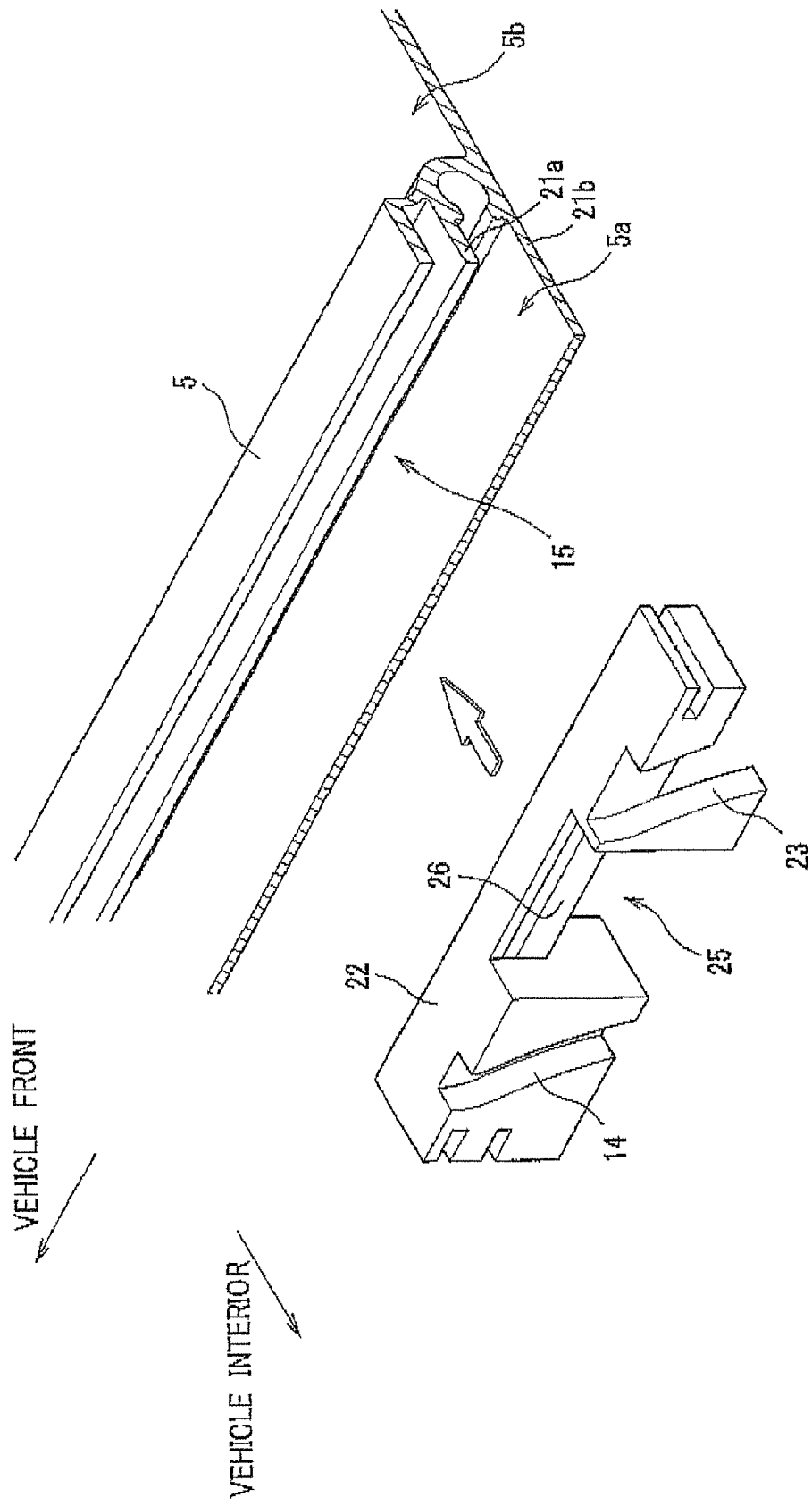

DEFLECTOR OF SLIDING ROOF SYSTEM

CROSS-REFERENCE TO RELATED APPLICATION

This application claims the foreign priority benefit under 35 U.S.C §119 of Japanese Patent Application No. 2009-074480 filed on Mar. 25, 2009, the disclosure of which is incorporated herein by reference.

BACKGROUND OF THE INVENTION

1. Field of the Invention

The present invention relates to a deflector of a sliding roof system.

2. Description of the Related Art

As a conventional deflector of a sliding roof system, there is disclosed a deflector including a blade installed on a front end of an opening of a fixed roof and moving upward and downward along with the open/close operation of a roof panel; arms installed on the right and the left end portions of the blade, each of which is provided with a cam pin and a support pin; a cam groove that guides a movement of the cam pin so as to define a movement trajectory of the blade; and a support groove that guides a frontward and backward movement of the support pin.

JP 3832948 B (see [0026] and FIG. 1) discloses that a structure in which an engagement portion 10 (cam pin) is guided along a slot of a cam portion 11 (cam slot) and a lateral shaft 8 (support pin) is guided along a slot of a support portion 9 (support slot), as shown in FIG. 1, etc., for example. JP 3832948 B discloses such a structure that can easily define the movement trajectory of the blade with greater flexibility, which facilitates manufacturing and assembling of the deflector and reduces the number of assembly parts thereof.

However, the technique of JP 3832948 B provides both the cam slot and the support slot closely to each other in one single support body, so that there is a problem that the support body size is likely to become bigger and the support body shape is likely to become more complicated.

To address such a problem, the present invention has an object to provide a deflector of a sliding roof system that simplifies a structure of a cam groove (slot) and a support groove (slot) that functions to guide a deflector to move upward and downward.

SUMMARY OF THE INVENTION

In order to address the above problem, the present invention provides a deflector of a sliding roof system including a blade provided along on an front edge of an opening of a fixed roof and moving upward and downward along with an opening and closing movement of a roof panel; arms installed on right and left end portions of the blade, each of the arms provided with a cam pin and a support pin; a cam groove that guides the cam pin and defines a movement trajectory of the blade; and a support groove that guides a frontward and backward movement of the support pin, wherein the support groove includes a guide frame that guides a frontward and backward movement of the roof panel.

According to the present invention, the groove of the guide frame that guides the frontward and backward movement of the roof panel is used as the support groove functioning to guide the support pin to move frontward and backward, thereby to eliminate an additional separate member dedicated for the support groove and also eliminate a complicated structure in which the cam groove and the support groove are provided in one single member, so that it is possible to simplify the structure of the cam groove and the support groove.

The present invention provides the cam groove in a base member having a lift guide groove that guides the lift-up movement of the roof panel.

According to the present invention, since the cam groove is provided in the base member having the lift-up guide groove that guides the lift-up movement of the roof panel, the number of the parts of the deflector can be reduced, so that an economically efficient deflector of a sliding roof system can be realized.

Other features and advantages of the present invention will become more apparent from the following detailed descriptions of the invention when taken in conjunction with the accompanying exemplary drawings.

BRIEF DESCRIPTION OF THE DRAWINGS

FIG. 6 B is a cross sectional view taken along the line B-B of FIG. 4.

FIG. 7 is an outer perspective view of a base member including a cam groove and a lift guide groove according to this embodiment.

DETAILED DESCRIPTION OF THE PREFERRED EMBODIMENTS

Figure 1:
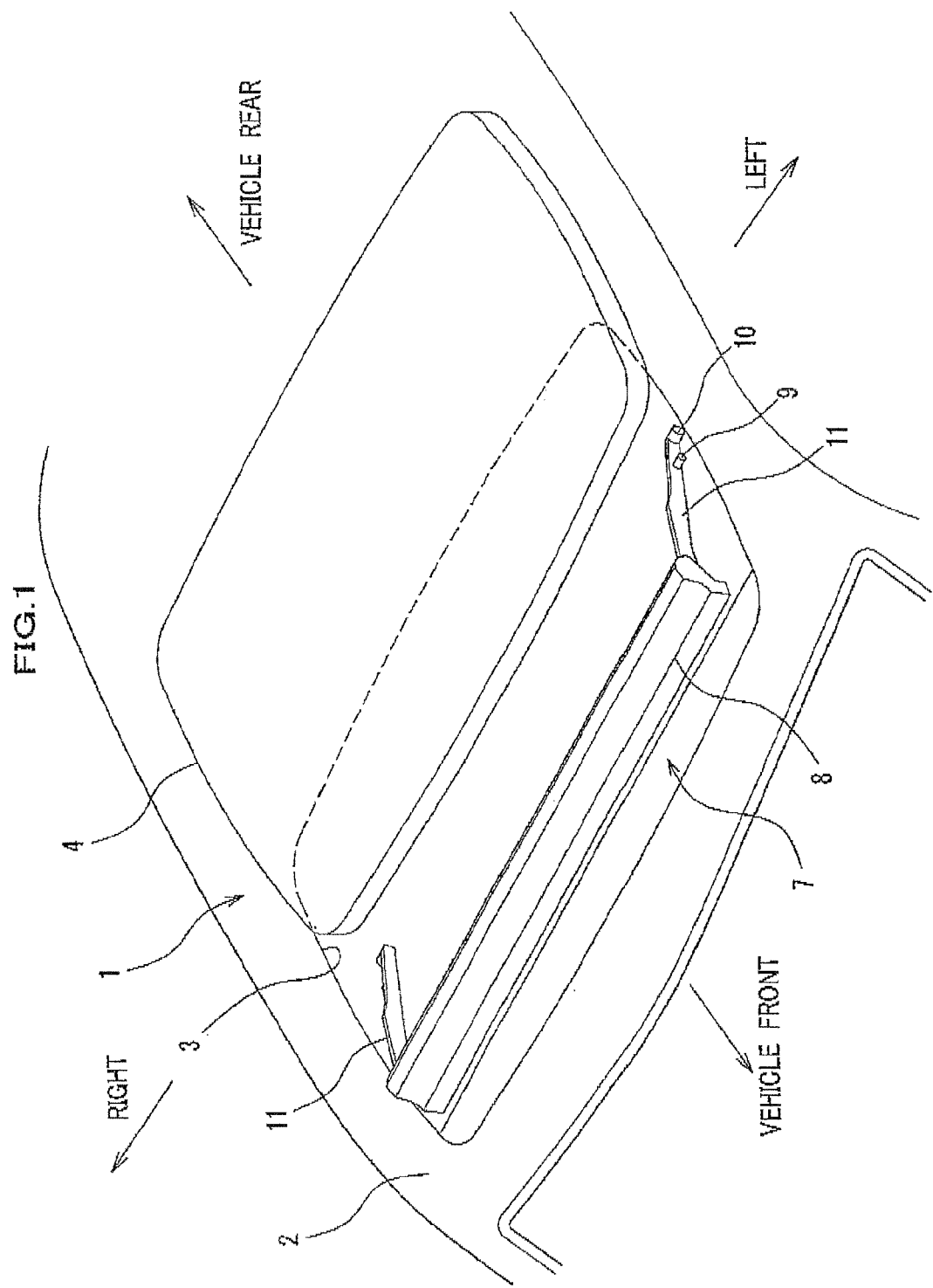
FIG. 1 is an outer perspective view of a deflector of a sliding roof system according to the present invention.

As shown in FIG. 1, the sliding roof system 1 includes a roof panel 4 that moves in the front and rear direction of a vehicle to open or close the opening 3 of the fixed roof 2. The sliding roof system 1 may be a sliding roof system of inner-sliding type, for example, and the roof panel 4 blocks the opening 3 in the close state thereof, and the rear end of the roof panel 4 is lifted up into the tilt-up state from the close state thereof so that air ventilation inside the vehicle, etc., can be carried out. In the sliding-open state, the roof panel 4 is lifted down from the close state and moves rearward inside the vehicle. The roof panel 4 does not move frontward and backward other than in the sliding-open state. The roof panel 4 may be a glass panel, for example.

Figure 2:
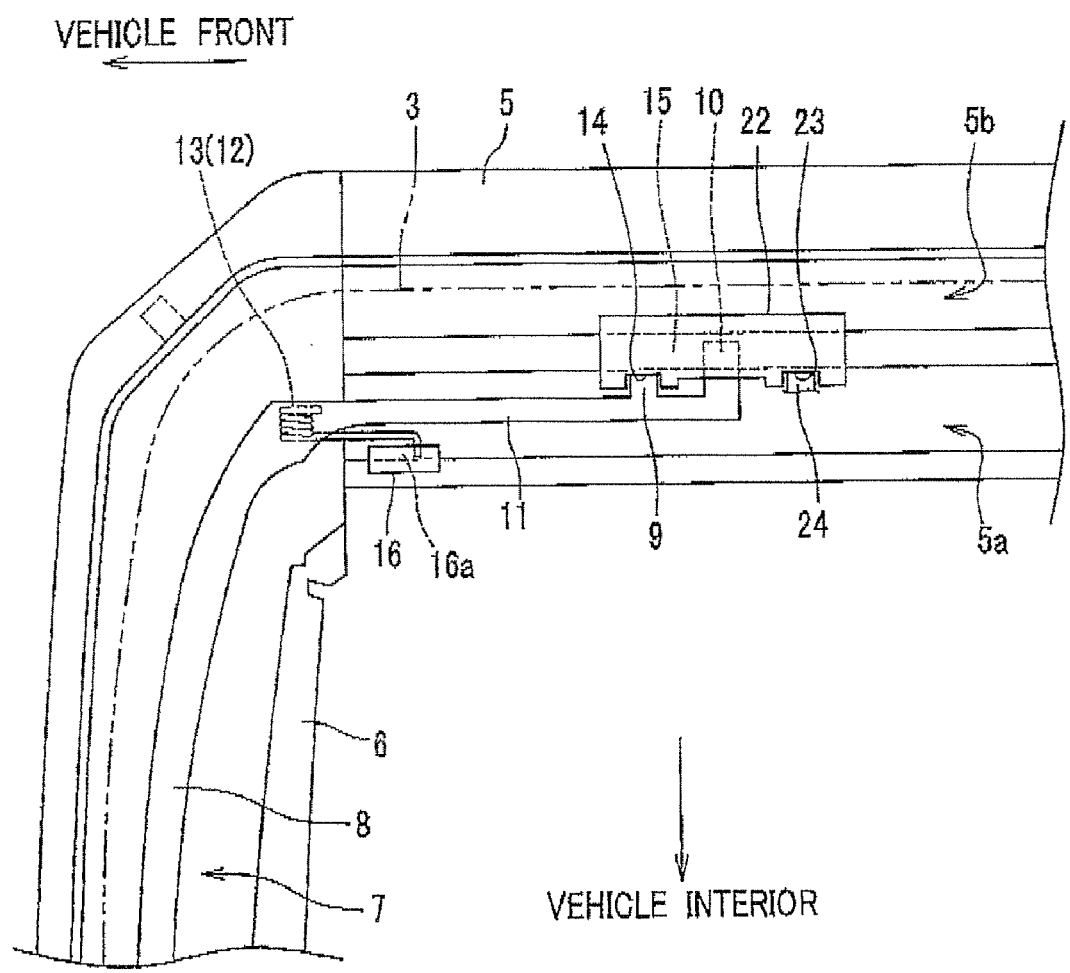
FIG. 2 is a plane view of a corner section of an arm and a blade of the deflector according to an embodiment of the present invention.
Figure 3:
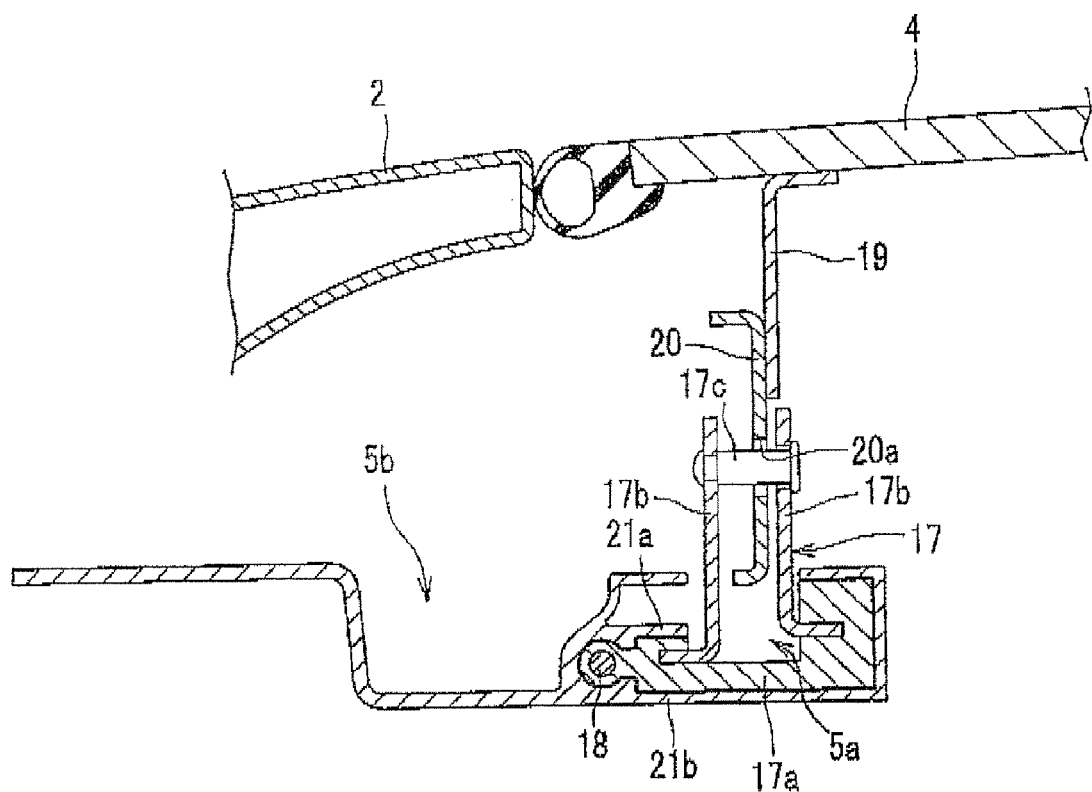
FIG. 3 is a cross sectional view of a structure of a slider and a guide frame according to this embodiment

There is provided a guide frame 5 beneath each of the right and left side edges of the opening 3, and extending in the longitudinal (front and rear) direction of the vehicle. In FIG. 2, only the guide frame on the right side is illustrated. This guide frame 5 may be formed of extruded aluminum alloy material, and has a cross sectional view as shown in FIG. 3, in which there are provided the guide rail 5a for guiding the slider 17 coupled to the roof panel 4 and the drain 5b for receiving water dropped from the roof panel 4, etc. The guide frames 5 on the right and left sides are coupled to each other through the front frame 6 provided beneath the front edge of the opening 3, as shown in FIG. 2.

In FIG. 3, the slider 17 includes the sliding shoe 17a that slides along in the guide rail 5a and a pair of the lifters 17b having a vertical plate shape, which are coupled to each other at the upper portion thereof with the pin 17c. The sliding shoe 17a is coupled to the pushing cable 18 that moves frontward and backward by a not shown driving source. The panel support stay 20 is fixed, via the bracket 19, on the lower face of the side edge of the roof panel 4, and the pin 17c is engaged with the lift-up cam slot 20a formed in the panel support stay 20. In such a structure, the sliding shoe 17a slides along in the guide rail 5a, and the pin 17c moves in the lift-up cam slot 20a so that the roof panel 4 is lifted up or lifted down, and then the sliding shoe 17a and the roof panel 4 move together frontward and backward.

The deflector 7 includes the blade 8 provided along on the front edge of the opening 3 of the fixed roof 2 and moving upward and downward along with the open/close operation of the roof panel 4, the arms 11 provided on the right and left end portions of the blade 8, each of which is provided with the cam pin 9 and the support pin 10, the urging member 12 (torsion coil spring 13) constantly urging the blade 8 in the upward direction, the cam groove 14 that guides the cam pin 9 and defines the movement trajectory of the blade 8, and the support groove 15 that guides the frontward and backward movement of the support pin 10. Both the cam groove 14 and the support groove 15 are groove portions fixed to the vehicle body.

The blade 8 is lifted and stands up higher than the fixed roof 2 when the opening 3 is opened so as to change upward and rearward the direction of airflow flowing over the upper face of the fixed roof 2, and to reduce interfere with airflow suctioned from the vehicle interior, thereby to reduce generation of wind throb. The arms 11 that support the blade 8, extending toward the rear section of the vehicle, are installed at the both ends of the blade 8. The blade 8 and the arms 11 may be formed in separate members or may be formed integrally.

The cam pin 9 and the support pin 10, each having a pin axial direction extending in the width direction of the vehicle, are provided on one side face in the vicinity of the rear portion of each arm 11. The cam pin 9 is positioned closer to the vehicle front, and the support pin 10 is positioned at the rear end of the arm 11. The cam groove 14 where the cam pin 9 slides is formed to be a groove extending upward and frontward, and the support groove 15 where the support pin 10 slides is formed to be a groove approximately in a straight line in the front and rear direction of the vehicle. The support pin 10 and the support groove 15 serve to support the posture of the arm 11 as well as accepting the displacement of the arm 11 when the cam pin 9 slides along in the cam groove 14.

The torsion coil spring 13 is installed at each end portion of the blade 8 such that the coil axial direction of the torsion coil spring 13 is set in the vehicle width direction, and one end of the torsion coil spring 13 is hooked to the blade 8 and the other end thereof is hooked to the spring hook groove 16a of the coil support member 16 fixed to the front end portion of the guide frame 5 such that the torsion coil spring 13 slides along in the spring hook groove 16a. This spring hook groove 16a is formed in a straight-line shape extending upward and frontward.

Figure 4:
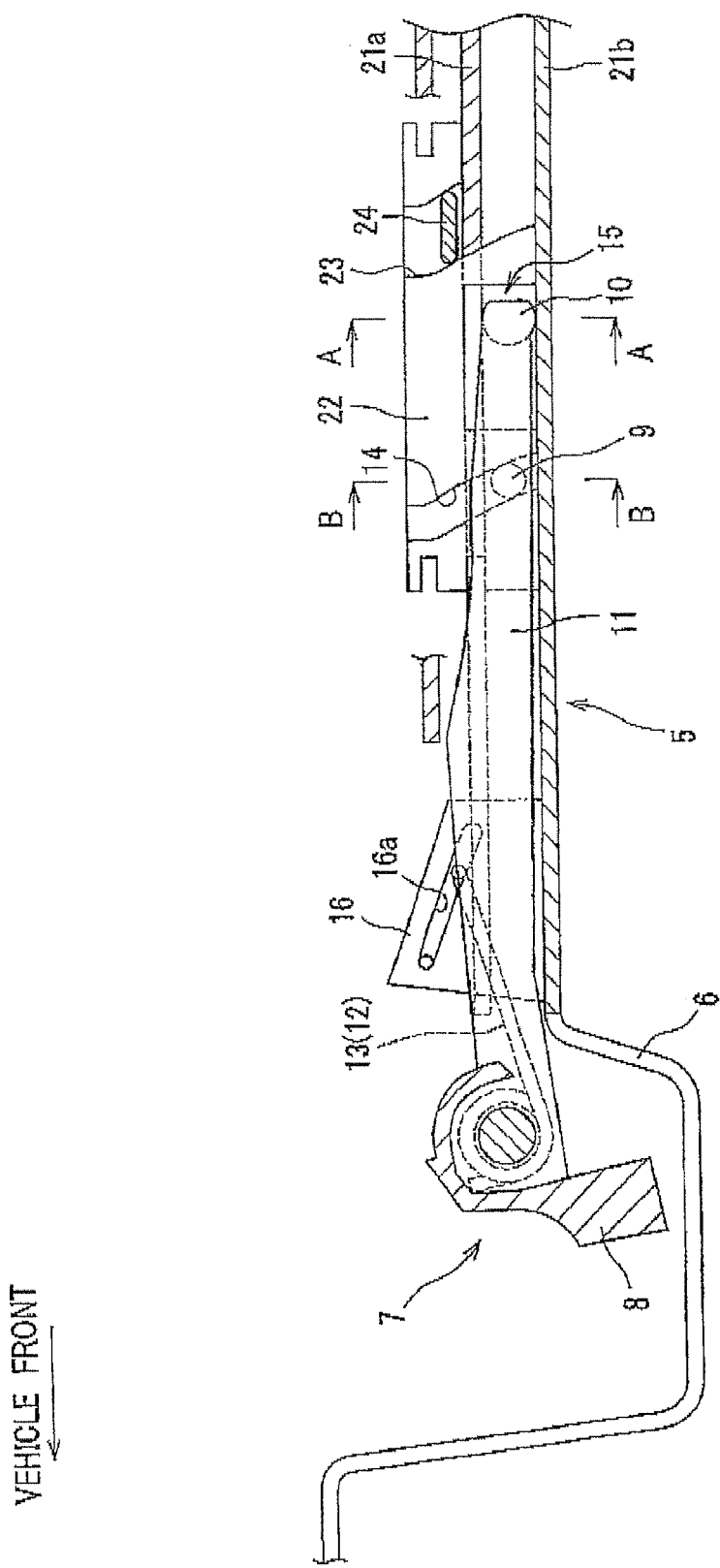
FIG. 4 is a sectional view of the deflector in the lift-down state according to this embodiment.

In the above structure, in the close state of the roof panel 4, a pushing member (a not shown member installed on the lower face of the roof panel 4 or to the slider 17, for example) moving along with the movement of the roof panel 4 pushes the upper face of the arm 11 to hold the blade 8 in the lift-down state as shown in FIG. 4; and in this lift-down state, the cam pin 9 stays in the lower position of the cam groove 14 and the support pin 10 stays in the rear position of the support groove 15, and the other end of the torsion coil spring 13 stays in the rear position of the spring hook groove 16a.

Figure 5:
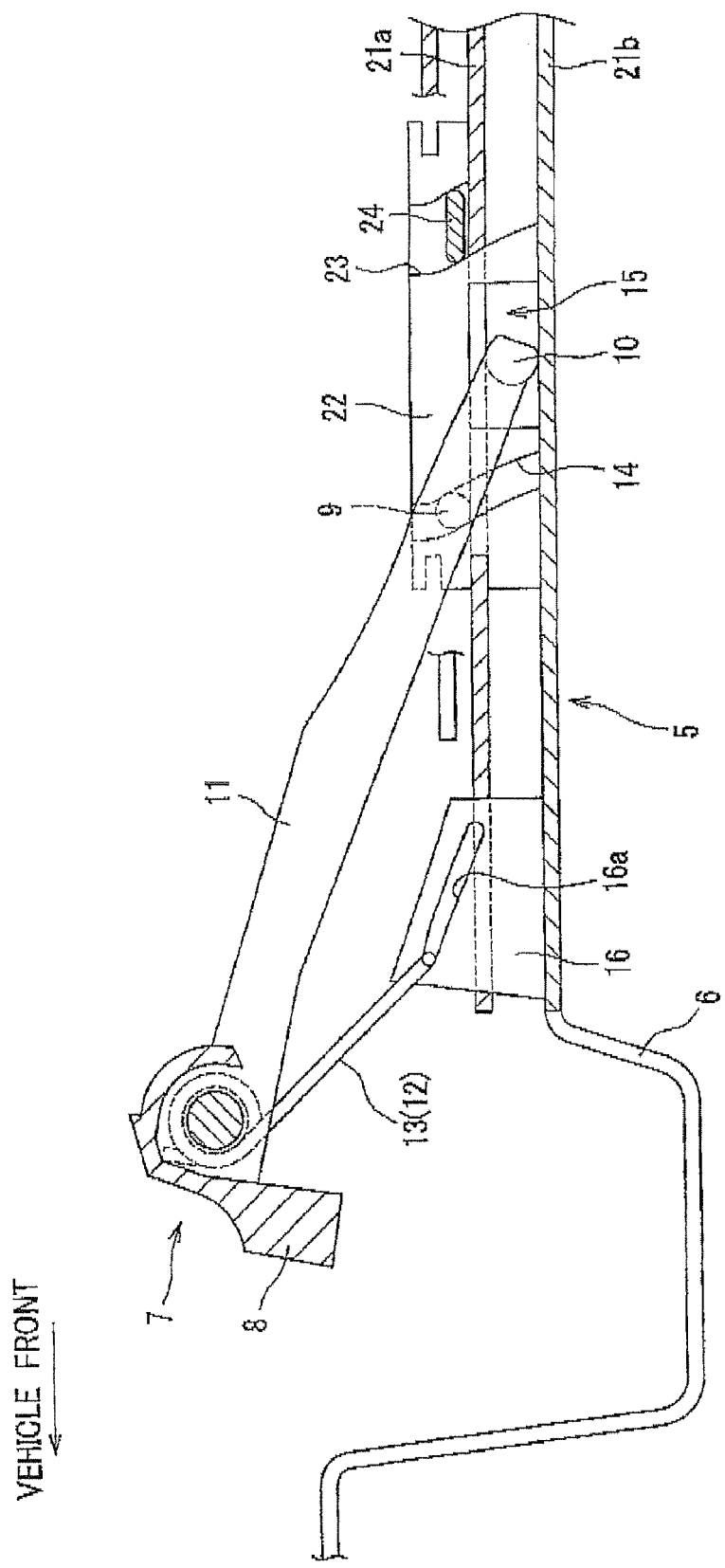
FIG. 5 is a sectional view of the deflector in the lift-up state according to this embodiment.

When the roof panel 4 opens and each arm 11 is released from the pushing force of the above mentioned pushing member, the other end of the torsion coil spring 13 moves in the spring hook groove 16a due to the elastic restoring force of the torsion coil spring 13, and the cam pin 9 moves upward in the cam groove 14 and the support pin 10 moves frontward in the support groove 15, so that the blade 8 is lifted up as shown in FIG. 5. The lift-up of the arms 11 is limited when the other end of the torsion coil spring 13 abuts the front end of the spring hook groove 16a.

The present invention has a primary feature that uses the groove of the guide frame 5 including the guide rail 5a for guiding the frontward and backward movement of the roof panel 4 as the support groove 15. As shown in FIG. 3, one end in the vehicle width direction of the slide shoe 17a of the slider 17 in the vehicle width direction slides along in the groove formed by the upper face portion 21a and the bottom face portion 21b of the guide rail 5a. In this embodiment, the groove formed by this upper face portion 21a and this bottom face portion 21b is used as the support groove 15 for the support pin 10.

In this embodiment, the cam groove 14 is formed in the base member 22 having the lift guide groove 23 that guides the lift-up movement of the roof panel 4. The lift-up movement of the roof panel 4 denotes an upward/downward movement of the roof panel 4 from its close state, and specifically denotes an upward movement of the roof panel 4 from its close state into its tilt-up state, and a downward movement of the roof panel 4 from its close state into its lift-down state that enables the panel sliding. As shown in FIG. 7, the base member 22 is fixed to the guide rail 5a such that the upper face portion 21a and the like of the guide rail 5a is inserted in a part of the base member 22, and then an engagement portion (not shown) of the base member 22 is engaged with a cut-off hole (not shown) of the guide rail 5a.

The lift guide groove 23 guides the lift-up cam boss 24 (FIG. 2 and FIG. 4) formed on the panel support stay 20 (FIG. 3), for example, so that the roof panel 4 is firmly held and prevented from coming off during the lift-up operation of the roof panel 4. Between the lower end of the lift guide groove 23 and the bottom face portion 21b of the guide rail 5a, there is provided a space for accepting the lift-up cam boss 24 while the roof panel 4 is in the lift-down state.

Figure 6A:
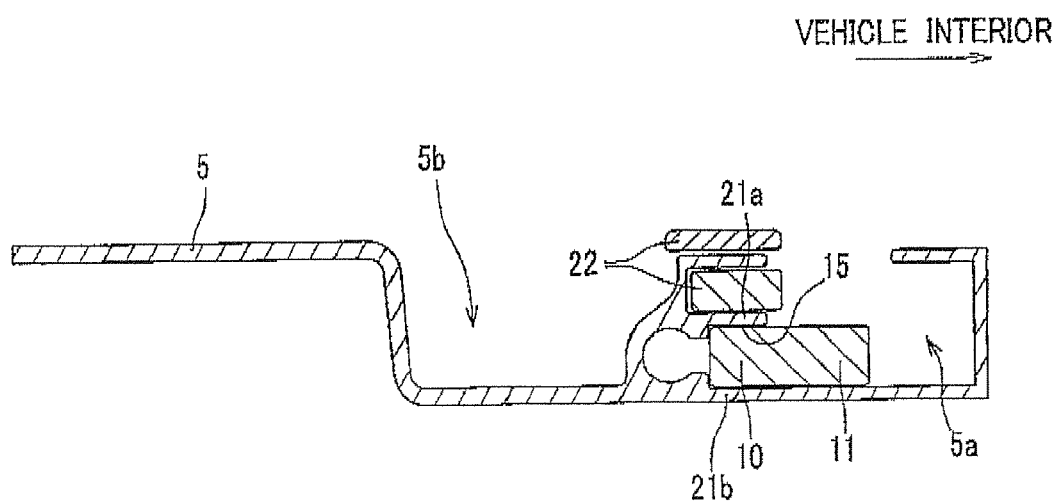
FIG. 6 A is a cross sectional view taken along the line A-A of FIG. 4.
Figure 6B:
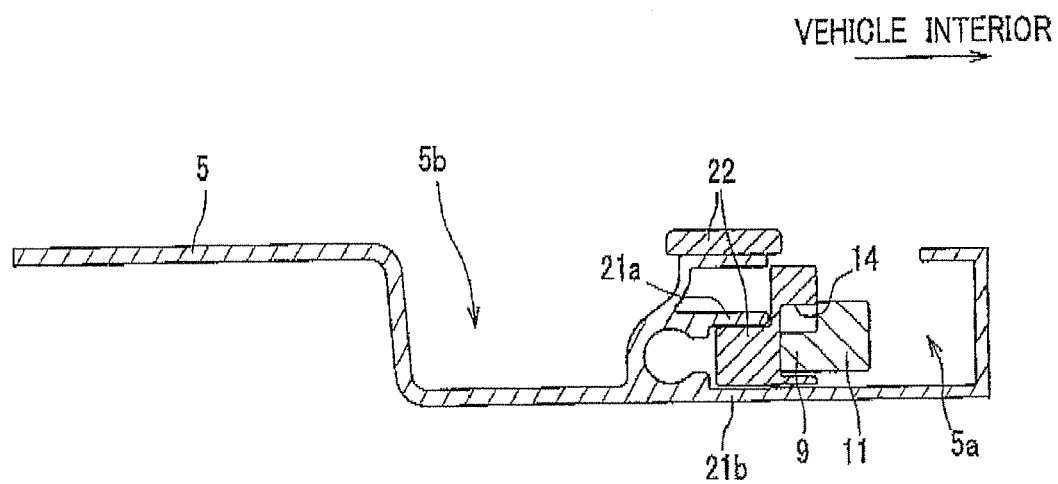

In FIG. 7, the base member 22 is provided with the cam groove 14 (also see FIG. 6B) closer to the vehicle front, as well as with the lift guide groove 23 closer to the vehicle rear. The front portion of the base member 22 where the cam groove 14 is formed and the rear portion of the base member 22 where the lift guide groove 23 is formed are integrated through the upper coupling portion 26, and the opening 25 is formed beneath this upper coupling portion 26. The support pin 10 (see FIG. 2, FIG. 4, etc.) is inserted through this opening 25, and is engaged with the support groove 15 formed by the upper face portion 21a and the bottom face portion 21b of the guide rail 5a, as shown in FIG. 6A.

As described above, this embodiment uses the groove of the guide frame 5 for guiding the frontward and backward movement of the roof panel 4 as the support groove 15 for guiding the support pin 10 to linearly move in the front and rear direction of the vehicle. Such a structure eliminates an additional separate member dedicated to the support groove 15, and also eliminate a complicated structure as disclosed in JP 3832948 B, where a cam groove and a support groove are provided in one single support body, so that the shape of the support body, that is, the base member 22 of the present invention can be simplified.

Since the cam groove 14 is formed in the base member 22 having the lift guide groove 23 that guides the lift-up movement of the roof panel 4, the number of the parts of the deflector can be reduced, thereby to realize an economically efficient deflector of a sliding roof system.

The preferred embodiment of the present invention has been described above, and the present invention is not limited to descriptions of the attached drawings, and may be varied or modified without departing from the spirit and scope of the present invention. The above described embodiment exemplifies the sliding roof system having the single roof panel 4, and may also be applicable to a sliding roof system having plural movable roof panels divided into front and rear sections.

The present invention can simplify the structure of the cam groove and the support groove for guiding upward and downward movement of the deflector.

The embodiment according to the present invention has been explained as aforementioned. However, the embodiment of the present invention is not limited to those explanations, and those skilled in the art ascertain the essential characteristics of the present invention and can mike the various modifications and variations to the present invention to adapt it to various usages and conditions without departing from the spirit and scope of the claims.

What is claimed is:

1. A deflector of a sliding roof system comprising:
 a blade provided along on an front edge of an opening of a fixed roof, the blade moving upward and downward along with an opening and closing movement of a roof panel;
 arms installed on right and left end portions of the blade, each of the arms provided with a cam pin and a support pin;
 a cam groove that guides the cam pin and defines a movement trajectory of the blade; and
 a support groove that guides a frontward and backward movement of the support pin,
 wherein
 the support groove comprises a guide frame that guides a frontward and backward movement of the roof panel.

2. The deflector of a sliding roof system as claimed in the claim 1, wherein the cam groove is provided in a base member having a lift guide groove that guides a lift-up movement of the roof panel.

\* \* \* \* \*